United States Patent

[11] 3,612,145

[72] Inventors Andrew J. Darula
Lakewood;
John D. Knight, Mantua, both of Ohio
[21] Appl. No. 1,817
[22] Filed Jan. 9, 1970
[45] Patented Oct. 12, 1971
[73] Assignee The Astrup Company
Cleveland, Ohio

[54] ROLLUP AWNING
16 Claims, 10 Drawing Figs.

[52] U.S. Cl. ................................................ 160/67,
135/1 A, 135/5 A
[51] Int. Cl. ................................................ E04f 10/06
[50] Field of Search ............................................ 160/400,
22, 45–67, 23 R, 392; 135/5, 5 A, 1 A; 49/55

[56] References Cited
UNITED STATES PATENTS

| | | | | |
|---|---|---|---|---|
| 1,049,485 | 1/1913 | Hoyt | | 160/392 X |
| 2,423,402 | 7/1947 | Olsen | | 135/5 A |
| 2,508,757 | 5/1950 | Gray | | 135/5 A |
| 2,573,060 | 10/1951 | Rauglas | | 135/5 A |
| 2,811,935 | 11/1957 | Jones | | 135/5 A X |
| 2,928,146 | 3/1960 | Kuniholm | | 49/55 X |
| 3,324,869 | 6/1967 | Duda | | 135/1 A |
| 3,503,566 | 3/1970 | Travis | | 160/22 X |

*Primary Examiner*—Peter M. Caun
*Attorney*—Frease and Bishop

ABSTRACT: A fabric rollup awning for use on travel trailers, mobile homes, residential patios and terraces, and commercial and industrial applications for quick shade from the sun. A pocket at the upper edge of the fabric molding contains a ¼-inch nylon cord which is slid through the conventional trailer molding attached to the sidewall of the structure. A front bar roller has a spherical groove which slidably receives a nylon cord located in a pocket attached to the front portion of the fabric awning. Two-piece telescoping spring-loaded rafters extend from the upper end of the fabric awning to the front bar roller and support the same; and uprights are pivotally attached to the ends of the roller and support the same either from the sidewall of the trailer or building or from the ground. Roller end assemblies upon the front bar roller incorporate spring-loaded hexagonal trunnions and ratchet means is associated therewith for rolling the front bar roller up or down.

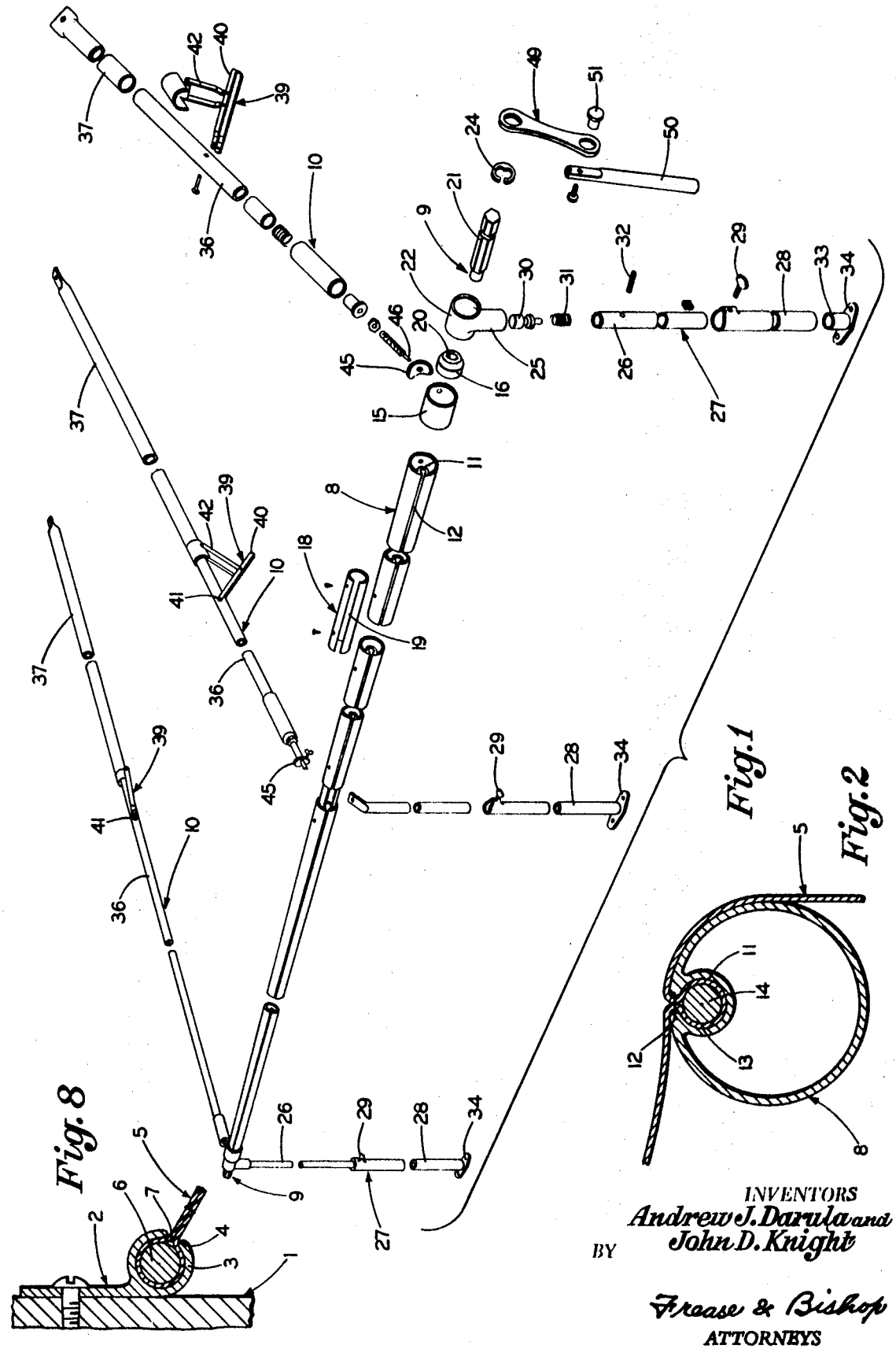

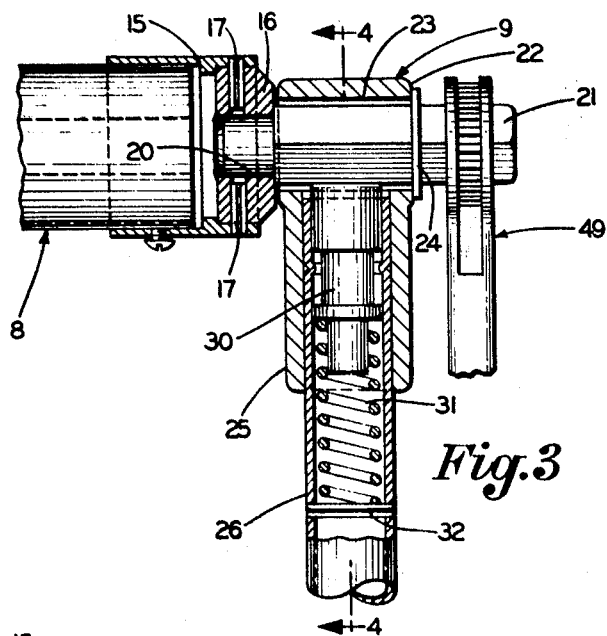
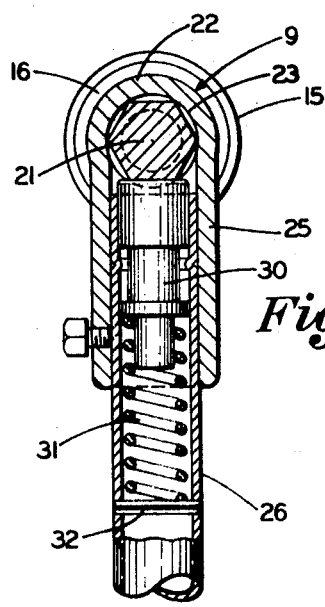
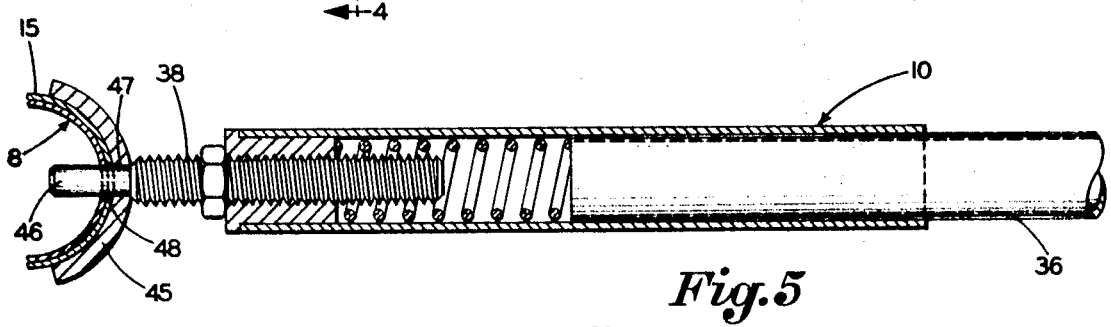
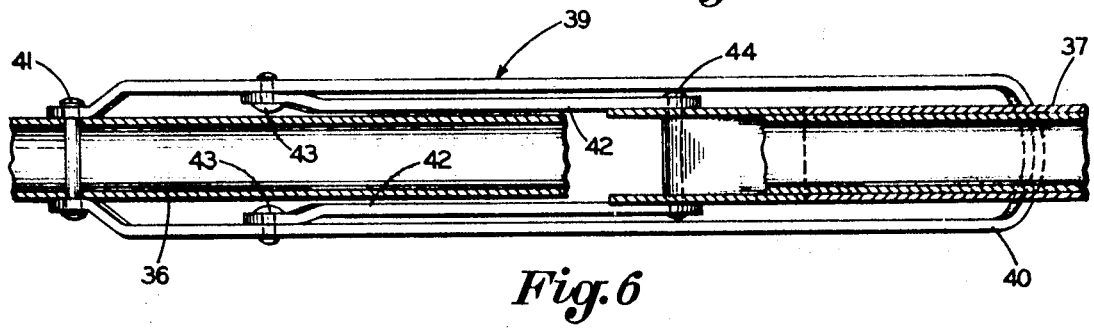
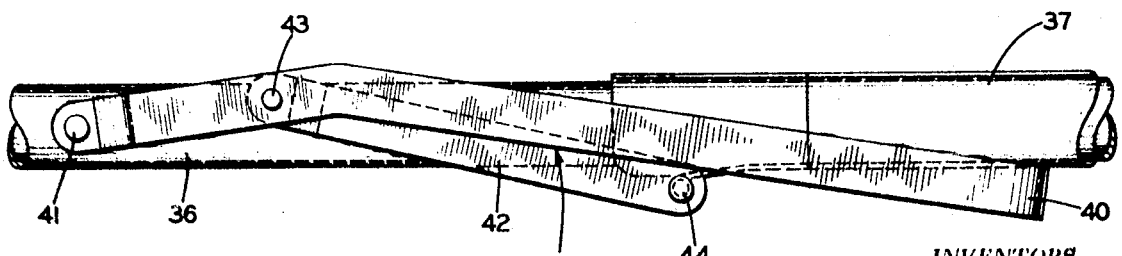

INVENTORS
Andrew J. Darula and
John D. Knight
BY
Frease & Bishop
ATTORNEYS 3,612,145

ROLLUP AWNING

CROSS-REFERENCE TO RELATED APPLICATION

The only related application owned by applicants' assignor, The Astrup Company, is an application by applicants for Self-Storing Awning, Ser. No. 803,714, filed Mar. 3, 1969. In that application, however, the awning includes a frame having a hood portion for attachment above a window, a roller in the hood, rope means for rotating the roller, and a fabric awning having one end portion rolled upon the roller. A front bar is attached to the front end of the awning fabric, and awning arms are adjustably attached at their upper ends to the front bar and have hinge means at their lower ends for hingedly attaching them to a wall with spring means urging said awning arms outward.

BACKGROUND OF THE INVENTION

1. Field of the Invention

The invention relates to a fabric rollup awning especially designed for use on travel trailers, mobile homes, residential patios and terraces, and commercial or industrial applications where quick shade from the sun is desired.

2. Description of the Prior Art

The closest prior art known to applicants is U.S. Pat. No. 1,181,715 issued May 2, 1916; U.S. Pat. No. 2,423,402 issued July 1, 1947 and Pat. No. 3,324,869 issued June 13, 1967.

However, none of these patents shows a rollup awning for trailers, mobile homes, and the like comprising the combination of a fabric awning with a nylon cord in the upper portion thereof slidably receivable in a substantially circular groove in the conventional trailer molding provided on mobile units; a nylon cord in a hem or pocket at the front or lower portion of the fabric awning, slidably receivable in a substantially circular groove in a front bar roller; the ends of the front bar roller being rotatably connected to uprights which may be hingedly connected at their lower ends to the trailer or other structure, or which may be located upon the ground; two-piece, telescoping, spring-loaded rafters connected at suitable intervals to the front bar roller and to the trailer or other structure; spring-loaded, hexagonal trunnions at the ends of the front bar roller; and ratchet means for engaging the same for rolling the front bar roller up or down.

SUMMARY OF THE INVENTION

A primary object of the invention is to provide an improved rollup awning for trailers, mobile homes and the like, in which a fabric awning may be detachably connected at its upper edge to the vehicle whereby it may be easily opened for use and closed or collapsed into nonoperating position so that the trailer or other vehicle may be moved with the awning positively locked thereto in collapsed position.

Another object of the invention is to provide an awning of this characteristic which is simple and economical in construction and may be readily attached to a trailer or the like and easily used thereon.

A further object of the invention is to provide a ratchet-operated front bar roller upon which a fabric awning is rolled or unrolled.

A still further object is to provide such an awning in which the front bar roller is provided at opposite ends with end assemblies including hexagonal, spring-mounted trunnions to prevent the roller from unrolling accidentally and to also position the fabric awning or cover at any desired position or increment up or down.

Another object of the invention is to provide a two-piece, telescoping, spring-mounted rafter incorporating a screw-type length adjustment to accommodate variation in fabric cover length, and a cam-type of tension lever for extending the rafter to stretch the fabric taut after the rafter is in place.

A further object of the invention is to provide an awning which utilizes an aluminum angle mounting hinge, which carries a swivel tube support from which each upright may be easily released by one man to erect the awning.

A still further object of the invention is to provide such an awning in which the mounting hinge and swivel are also used as a carrier bracket when the awning is rolled up against the trailer for transit, or against the wall of a residence or other building.

Another object of the invention is to provide an awning of this type in which the uprights are telescoping tubes, each with a locking thumb screw permitting easy adjustment of the awning pitch and front bar roller height.

These and other objects, apparent from the drawings and following description, may be attained, the above described difficulties overcome and the advantages and results obtained, by the apparatus, construction, arrangement and combinations, subcombinations and parts which comprise the present invention, a preferred embodiment of which, illustrative of the best mode in which applicants have contemplated applying the principle, being set forth in detail in the following description and illustrated in the accompanying drawings.

BRIEF DESCRIPTION OF THE DRAWINGS

FIG. 1 is an exploded perspective view of the entire frame for the awning, including the front bar roller, the uprights and the rafters and the ratchet device for rolling the front bar roller up or down;

FIG. 2 is an enlarged cross-sectional view of the front bar roller;

FIG. 3 is a sectional view of the roller end assembly and ratchet;

FIG. 4 is a section on the line 4—4, FIG. 3;

FIG. 5 is an enlarged horizontal section through a rafter;

FIG. 6 is a longitudinal sectional view of the tension lever;

FIG. 7 is a side elevation of the tension lever;

FIG. 8 is a section through the conventional mounting molding upon the trailer for the top of the awning;

DESCRIPTION OF THE PREFERRED EMBODIMENT

Figure 9:
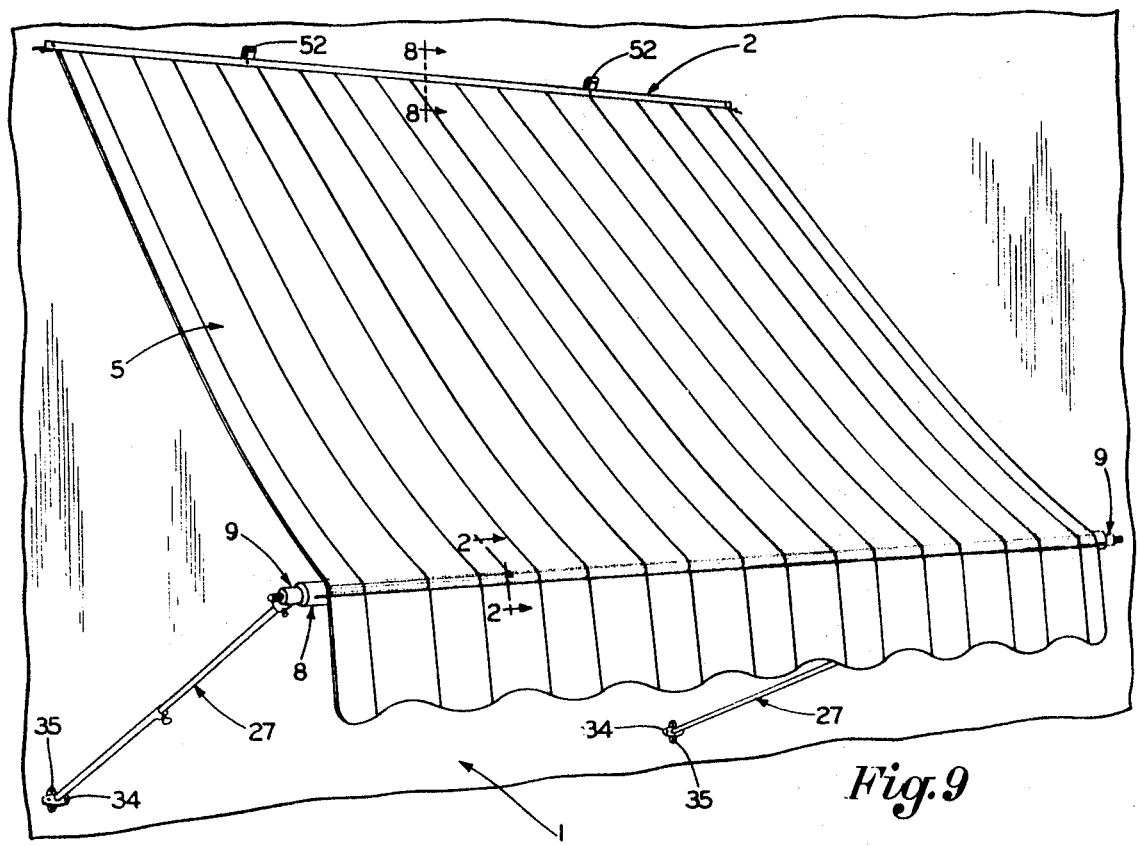
FIG. 9 is a perspective view of the awning rolled down.

Reference is now made to the embodiment of the invention illustrated in the drawings in which similar reference numerals indicate similar parts throughout the several views.

Figure 10:
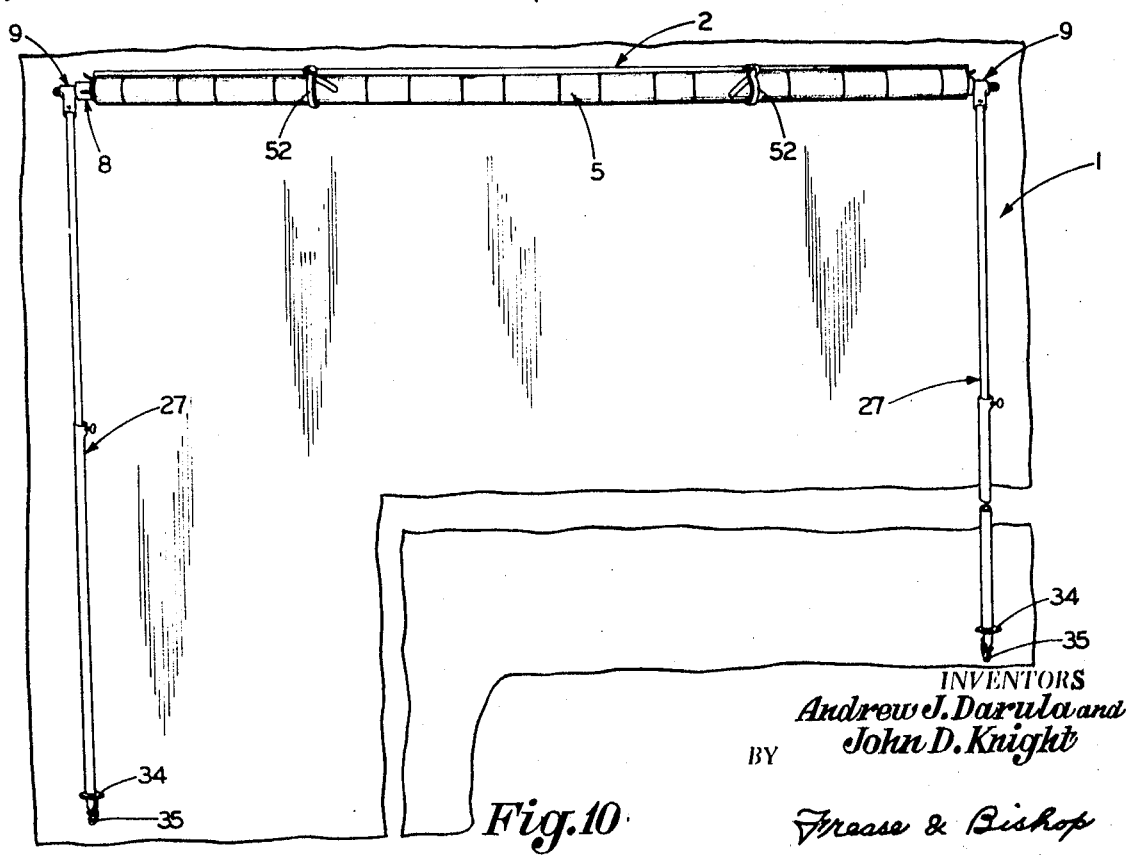
FIG. 10 is a similar view of the awning rolled up.

The sidewall of a travel trailer, mobile home, or the like, is indicated at 1 in FIGS. 9 and 10. The conventional trailer molding or awning rail, ordinarily located upon the sidewall of a trailer near the roof thereof, is indicated generally at 2 (FIGS. 8 and 9). This trailer molding or awning rail has a substantially circular groove 3 therein with a restricted slot 4 communicating therewith.

The fabric awning or cover, indicated generally at 5, has a ¼-inch nylon rope or cord 6 enclosed in a hem or pocket 7 at its upper edge. The fabric pocket containing the nylon rope or cord may be slidably inserted into the circular groove 3 of the trailer molding or awning rail 2.

The entire frame for the awning is shown in perspective, all parts being shown detached from each other in an exploded or expanded manner, in FIG. 1. The parts of the frame comprise the front bar roller indicated generally at 8, having two roller end assemblies, indicated generally at 9, and shown in detail in FIGS. 3 and 4; and the two-piece telescoping rafters indicated generally at 10.

The front bar roller 8, shown in detail in FIG. 2, as shown is of circular cross section with the circular, tubular groove 11 in one side thereof communicating with the restricted longitudinal slot 12.

The front or lower portion of the fabric awning or cover 5 has a pocket or hem 13 therein, enclosing a ¼ inch nylon rope or cord 14, which may be slidably entered into the circular groove 11 as best shown in FIG. 2.

One of the roller end assemblies, indicated generally at 9, is shown enlarged, in detail, in FIGS. 3 and 4. Each end assembly includes an end collar 15, having an end collar adapter 16 connected to one end as by a pair of spring pins 17.

The front bar roller 8 is preferably made in 2 ½-foot or 5-foot sections which are joined together, end to end, by special extruded couplings 18 (FIG. 1) each having a longitudinal groove 19 to accommodate the circular internal grooves 11 in the front bar roller sections.

Each end collar 15 fits over the adjacent end of the front bar roller and the end collar adapter 16 thereof has a cylindric central aperture 20 therein to receive the adjacent end of the corresponding hexagonal trunnion 21.

The end assembly includes a slip tee 22, having a horizontal opening 23 through which the corresponding hexagonal trunnion 21 is rotatably located. A retaining ring 24, such as a Waldes 05133-75 ring, is provided for retaining each trunnion 21 in the corresponding slip tee 22.

The stem 25 of the slip tee 22 receives the upper end of the uppermost telescoping tubular member 26 of the adjacent upright 27. The upper member 26 and lower member 28 of each upright 27 are locked in adjusted position by a thumb screw 29 which permits easy adjustment of awning pitch and front bar roller height (FIG. 1).

The ratchet adapter 30 is located within the stem 25 of the slip tee 22, and a compression spring 31 is interposed between the same and the spring pin 32 in the upper tubular member 26 to urge the ratchet adapter toward the corresponding hexagonal trunnion 21, to hold the front bar roller in adjusted position and prevent it from unrolling by itself, and to also position the fabric awning or cover 5 in any desired position or increment either up or down.

The lower end of the lower telescoping tube 28 of each upright 27 is connected to a swivel tubing support 33 (FIG. 1), pivoted as at 34 to a bracket 35, attached to the wall 1 of the trailer or other vehicle or structure, or to the ground if desired.

Two or more rafters 10 may be attached at their front ends to the front bar roller 8, as hereinafter described, and at their rear or upper ends bear against the sidewall 1. Each rafter 10 is a two-piece telescoping spring loaded rafter comprising the telescoping tubular sections 36 and 37.

A 3-inch screw-type adjustment 38 (FIG. 5) is provided for the two-piece telescoping rafter 10 to accommodate variations in fabric cover length. This adjustment need only be made at the time of initial installation.

A 4-inch throw cam type of tension lever indicated generally at 39 (FIGS. 6 and 7) is provided for extending each rafter 10 to stretch the awning fabric or cover 5 taut after the rafter is in place.

Each lever 39 comprises the U-shape lever portion 40, pivotally connected at 41 to one of the telescoping rafter members 36, and the links 42, pivoted at 43, to the U-shape lever 40, and at 44 to the other telescoping tubular member 37.

The awning is so designed that any number of intermediate rafters and uprights can be added, if desired. These can be used as rafters only, the rafter being designed so that it needs no upright, if not desired, but fixes to the front bar roller 8 by means of a yoke-type end assembly including yoke 45.

The reduced end 46 upon the front of the lower rafter member 36 extends through a suitable opening 47 in the yoke 45 and into an aperture 48 in the end cap 15 and may extend through a similar aperture in the front bar roller, holding the awning taut and preventing rotation of the front bar roller 8 until the rafter is removed in order to roll up the fabric cover or awning 5 to the position shown in FIG. 10, so that the trailer or the like may be moved with the awning rolled up against the sidewall 1 thereof.

If desired, straps 52 may be wrapped around the rolled up awning fabric or cover 5, as shown in FIG. 10, and buckled or otherwise fastened so that the awning fabric or cover will remain tightly rolled around the front bar roller 8 as the vehicle is moved along the highway.

As shown in FIGS. 1 and 3 a ratchet wrench indicated generally at 49 with the operating handle 50 swivel connected thereto, as at 51, is provided at one end of the front bar roller 8 for engaging the adjacent hexagonal trunnion 21 and rotating the front bar roller in either direction as desired to unroll or roll up the fabric awning or fabric 5.

In the foregoing description certain terms have been used for brevity, clearness and understanding, but no unnecessary limitations are to be implied therefrom beyond the requirements of the prior art, because such words are used for descriptive purposes herein and are intended to be broadly construed.

Moreover, the embodiments of the improved construction illustrated and described herein are by way of example, and the scope of the present invention is not limited to the exact details of construction.

Having now described the invention or discovery, the construction, the operation, and use of the preferred embodiments thereof, and the advantageous, new and useful results obtained thereby; the new and useful construction, and reasonable mechanical equivalents thereof obvious to those skilled in the art, are set forth in the disclosure.

We claim:

1. A rollup awning for a travel trailer, mobile home or other structure having an awning rail with a substantially circular cross-sectional groove therein attached to a wall thereof; said rollup awning comprising a flexible cover having a transversely disposed cord attached to its upper or rear edge for slidable engagement with the groove in said awning rail, a frame for the awning including a front bar roller having a longitudinally disposed circular cross-sectional groove therein, a pair of front bar roller end members, means rotatably connecting the front bar roller to said front bar roller end members, said flexible cover having a transversely disposed cord attached thereto adjacent the front or lower edge thereof for slidable engagement with the groove in said front bar roller, rafter means interposed between said front bar roller and said wall for holding said flexible cover taut, two end assemblies upon the front bar roller, each end assembly including a hexagonally shaped trunnion, spring loaded to prevent the front bar roller from unrolling by itself and also to position the fabric cover at any desired position or increment up or down.

2. A rollup awning as defined in claim 1 including a ratchet device operatively connected to one of the hexagonal trunnions for rolling the front bar roller up or down as desired.

3. A rollup awning as defined in claim 1 in which each end assembly includes a slip tee through the hollow bar of which the adjacent hexagonal trunnion is rotatably located and in the stem of which is located a spring-loaded ratchet adapter normally urged into contact with a flat side of said trunnion.

4. A rollup awning as defined in claim 1 in which each end assembly includes an end collar receiving the adjacent end of the front bar roller, there being a transversely disposed aperture in said end collar, and a reduced outer end on the corresponding rafter received in said aperture.

5. A rollup awning as defined in claim 4 in which a curved yoke with an aperture therein is interposed between the outer end of the rafter and the adjacent end collar.

6. A rollup awning as defined in claim 3, in which an upright is connected to the lower end of the stem of each slip tee.

7. A rollup awning as defined in claim 1 in which said transverse cords are enclosed in pockets formed in the underside of the flexible cover.

8. A rollup awning as defined in claim 1 in which each rafter has a screw-type length adjustment.

9. A rollup awning as defined in claim 1 in which each rafter is a two-piece telescoping rafter.

10. A rollup awning as defined in claim 9 in which each rafter has a cam-type of tension lever for extending the rafter to stretch the fabric cover taut after the rafter is in place.

11. A rollup awning as defined in claim 10 in which each rafter has a screw-type length adjustment.

12. A rollup awning as defined in claim 1 in which each rafter is a two-piece telescoping rafter with a screw-type length adjustment.

13. A rollup awning as defined in claim 1 including uprights having their upper ends connected to said end members.

14. A rollup awning as defined in claim 13 including brackets fixed to said wall, and a tubing support swiveled to each bracket for detachable connection to the lower end of the adjacent upright.

15. A rollup awning as defined in claim 13 in which each upright is formed of two telescoping members with a set screw for holding them in adjusted position.

16. A rollup awning as defined in claim 1 in which the front bar roller is made of a plurality of sections joined together with extruded couplings each having a longitudinal slot in one side.